United States Patent
Ranjan et al.

(10) Patent No.: US 10,106,066 B2
(45) Date of Patent: Oct. 23, 2018

(54) HEAD RESTRAINT SYSTEM

(71) Applicant: KPIT TECHNOLOGIES LTD., Pune (IN)

(72) Inventors: Ravi Ranjan, Pune (IN); Shivaswaroop C.P., Pune (IN)

(73) Assignee: KPIT TECHNOLOGIES LTD., Pune (IN)

( * ) Notice: Subject to any disclaimer, the term of this patent is extended or adjusted under 35 U.S.C. 154(b) by 97 days.

(21) Appl. No.: 15/120,417

(22) PCT Filed: Feb. 20, 2015

(86) PCT No.: PCT/IN2015/000097
§ 371 (c)(1),
(2) Date: Aug. 19, 2016

(87) PCT Pub. No.: WO2015/125157
PCT Pub. Date: Aug. 27, 2015

(65) Prior Publication Data
US 2017/0066353 A1  Mar. 9, 2017

(30) Foreign Application Priority Data
Feb. 20, 2014  (IN) .......................... 586/MUM/2014

(51) Int. Cl.
*A47C 1/10* (2006.01)
*B60N 2/806* (2018.01)
(Continued)

(52) U.S. Cl.
CPC ............. *B60N 2/806* (2018.02); *B60N 2/838* (2018.02); *B60N 2/865* (2018.02)

(58) Field of Classification Search
CPC .. B60N 22/4838; B60N 2/4864; B60N 2/427; B60N 2/42727; B60N 2/42772;
(Continued)

(56) References Cited

U.S. PATENT DOCUMENTS 7,232,187 B1 *  6/2007  Sundararajan ....... B60N 2/0232
                                                      297/410
7,374,239 B1 *  5/2008  Jayasuriya ............. B60N 2/838
                                                      297/216.12
(Continued)

FOREIGN PATENT DOCUMENTS

DE        2152437        4/1973
WO    WO2011/032678     3/2011

OTHER PUBLICATIONS

International Search Report dated Jul. 17, 2015 regarding Application No. PCT/IN2015/000097.

*Primary Examiner* — Chi Q Nguyen
(74) *Attorney, Agent, or Firm* — Foley & Lardner LLP

(57) ABSTRACT

The present invention describes a head restraint system for a vehicle. The head restrained system comprises a head restraint cushion connected to headrest rods. The swivel mechanism comprises swivel rods, dampers and springs. The angular movement of the head restraint cushion is controlled by the damper movement on application of load on the head restrained cushion, where the damper movement is based on the amplitude and duration of load being applied on head restrained cushion. Another embodiment of the present invention describes a head restraint system comprising a movable assembly and a stationary assembly. The movable assembly comprises slotted guide plate, flat plate and slotted guide column. The stationary assembly comprises guide rod, and linear guide way. The movable assembly and stationary assembly are connected using a linear damping unit, where the linear damping unit is placed inside the slotted guide column.

19 Claims, 5 Drawing Sheets

(51) Int. Cl.
*B60N 2/838* (2018.01)
*B60N 2/865* (2018.01)

(58) Field of Classification Search
CPC .......... B60N 2/42; B60N 2/48; B60N 2/4805;
B60N 2/4808; B60N 2/4823; B60N
2/4826; B60N 2/806
USPC ........ 297/404, 216.1, 216.12, 391, 406, 403
See application file for complete search history.

(56) References Cited

U.S. PATENT DOCUMENTS

| | | | | |
|---|---|---|---|---|
| 8,197,007 | B2* | 6/2012 | Lutzka | B60N 2/859 |
| | | | | 297/408 |
| 9,550,438 | B2* | 1/2017 | Mizobata | B60N 2/809 |
| 2008/0272631 | A1* | 11/2008 | Hartlaub | B60N 2/4838 |
| | | | | 297/216.12 |
| 2011/0089737 | A1* | 4/2011 | Tscherbner | B60N 2/821 |
| | | | | 297/391 |
| 2012/0112510 | A1* | 5/2012 | Ishimoto | B60N 2/4228 |
| | | | | 297/408 |
| 2013/0049428 | A1* | 2/2013 | Reel | B60N 2/4808 |
| | | | | 297/391 |
| 2014/0197671 | A1* | 7/2014 | Frotz | B60N 2/4864 |
| | | | | 297/391 |
| 2015/0123445 | A1* | 5/2015 | Mueller | B60N 2/4814 |
| | | | | 297/410 |

\* cited by examiner

HEAD RESTRAINT SYSTEM

RELATED APPLICATION

Benefit is claimed to Indian Provisional Application No. 586/MUM/2014 titled "HEAD RESTRAINT SYSTEM" filed on 20 Feb. 2014, which is herein incorporated in its entirety by reference for all purposes.

FIELD OF INVENTION

The present invention relates to the field of automobiles and more particularly relates to a head restraint system with swivel mechanism for vehicles.

BACKGROUND OF THE INVENTION

Vehicle having seats with head restraint is considered as one of the primary method of preventing a whiplash-induced injury in motor vehicles. A well designed and correctly aligned head restraint will vastly reduce the risk of injury to the head, spine and neck during rear-end collisions. Head restraint geometry, specifically head restraint height and horizontal distance 'setback' of the head restraint from the occupant's head can have a significant influence on the likelihood and severity of a whiplash injury in rear impact collisions. Most of the front seat occupants fail to adjust their head restraints correctly or have head restraints that are incapable of offering any protection. Whiplash can be prevented with a good head restraint system that is correctly positioned. To be effective, a head restraint must be as close to the back of the head as possible and the top of the restraint should be as high as the top of the head.

Generally, there are two types of the head restraint system i.e. active and passive. The active head restraint system is good at comfort since its position is ergonomically apt for an occupant and it instantaneously adjusts itself to offer safety in case of a crash. The passive head restraint systems are stationary. The passive head restraint system does not offer any swivel or angular adjustment. In a passive head restraint system the head restraint is placed very close to the head to avoid the bending of the neck during rear impact. Though it increases safety it results in lack of comfort for occupant.

Therefore, there is a need for an improved head restraint system (particularly the passive head restraint system) for providing all the advantages of the active head restraint system using passive components. Additionally, the improved head restraint system should be able to prevent whiplash injury.

SUMMARY

An objective of the invention is to provide a head restraint system for a vehicle An embodiment of the present invention describes a head restraint system for a vehicle with a swivel mechanism. The head restrained system according to the present invention comprises a head restraint cushion connected to one or more headrest rods. The said swivel mechanism for providing angular movement to the head restraint cushion fitted on top of backrest of seat of the vehicle comprises one or more swivel rods, one or more dampers and one or more springs. The angular movement of the head restraint cushion is being controlled by the damper movement on application of load on the head restrained cushion. Here, the damper movement is based on the amplitude and duration of load applied on head restrained cushion. The head rest rod is pivoted at the rear side of the back rest to accommodate the swivel mechanism of head restraint system, where the swivel mechanism provides swiveling of head restraint system about the pivot point. The head restraint system according to present invention is a retrofit system.

Another embodiment of the present invention describes a reactive, retrofit head restraint system of a vehicle. The head restraint system comprises a movable assembly and a stationary assembly. The movable assembly comprises at least one slotted guide plate, at least one flat plate and at least one slotted guide column. The stationary assembly comprises at least one guide rod, and at least one linear guide way. The movable assembly and stationary assembly are connected using a linear damping unit, where the linear damping unity is being placed inside the slotted guide column. The slotted guide plates and slotted guide column are connected at the rear side of the flat plate for supporting the translatory motion of the flat plates.

BRIEF DESCRIPTION OF THE ACCOMPANYING DRAWINGS

The aforementioned aspects and other features of the present invention will be explained in the following description, taken in conjunction with the accompanying drawings, wherein.

DETAILED DESCRIPTION OF THE INVENTION

Figure 1:
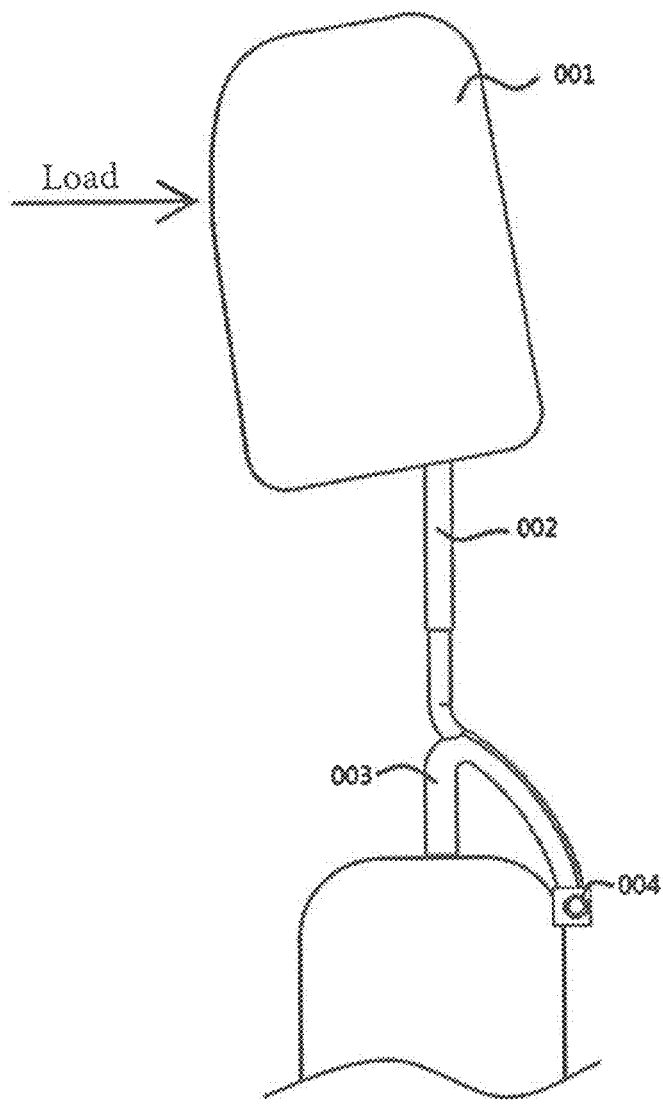
FIG. 1 is anisometric view of head restraint system having swivel mechanism according to one embodiment of present invention.

The embodiments of the present invention will now be described in detail with reference to the accompanying drawings. However, the present invention is not limited to the embodiments. The present invention can be modified in various forms without departing from the scope of the invention. Thus, the embodiments of the present invention and any examples illustrated are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention relates to a head restraint system which offers comfort and safety against whiplash. In the present invention, the head rest is designed in such a way that it can swivel in forward and backward direction, and enables the occupant to adjust the angle based on requirement/comfort. The swivel mechanism has a spring and a damper placed at the pivot, such that the headrest regains its position when occupant leans forward. The damper is designed such that in case of impact due to collision it restricts the movement of head restraint. This avoids whiplash injury whereas it offers very low resistance in case of low loads as in resting head over cushion and allows movement of head restraint to suit the occupant comfort. The various embodiments of the present invention can be incorporated to automotive seats and would be able to meet both safety and comfort requirements.

FIG. 1 is an isometric view of the head restraint system having a swivel mechanism according to an embodiment of the present invention. The embodiment of present invention shows the head restraint system having a head restraint cushion 001 connected with one or more head rest rods 002. The head rest rods 002 are joined with one or more swivel rods 003. The swivel rods 003 are adapted to accommodate the swivel mechanism 004. The head restraint system according to one embodiment of present invention is passive head restraint system which offers a safety against whiplash and comfort. The head restraint system according to present invention is designed to enable swivel in forward and backward direction. The original position of head restraint can be adjusted based on the comfortable angle of occupant. Further movement of head restraint system is based on the original position set by the occupant.

The swivel mechanism 004 according one embodiment of present invention comprises a spring and a damper placed at the swivel rod. The swivel rod is pivoted at the rear side of the back rest of the seat of the vehicle. The swivel rod is pivoted to accommodate the swivel mechanism of head restraint about a pivot point. This enables vertical height adjustment of the head restraint system of present invention. The head restraint system regains its original position when occupant leans forward. The damper is designed such that in case of impact due to collision it restricts the movement of head restraint system. This avoids whiplash injury to the user/occupant, whereas it offers very low resistance in case of low loads as in resting head over cushion and allows movement of head restraint to suit the occupant comfort.

Figure 2:
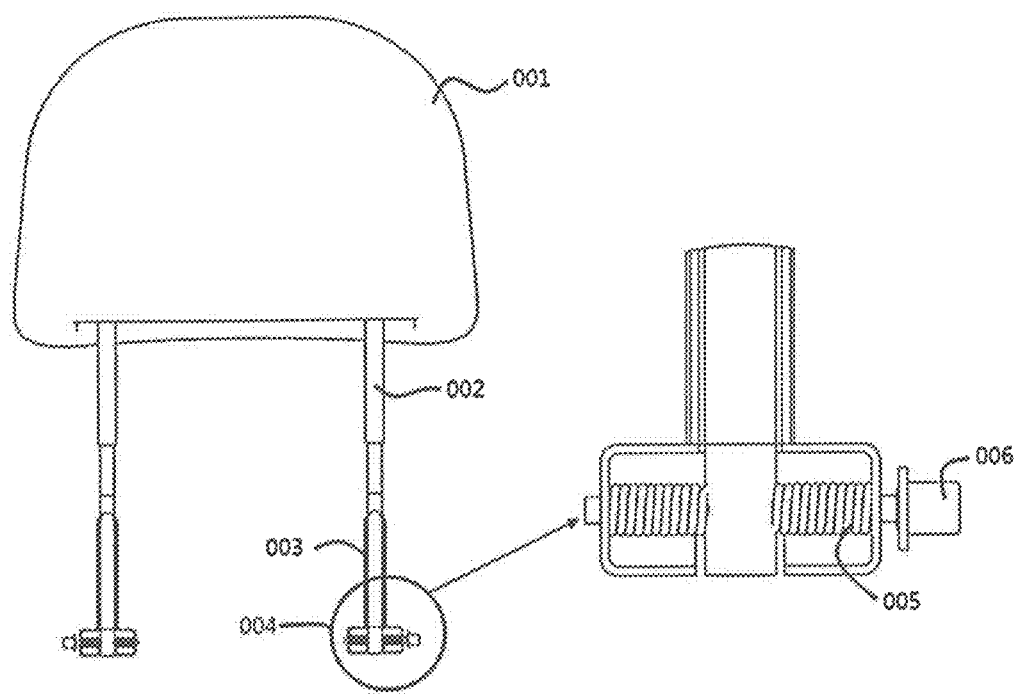
FIG. 2 is a schematic representation of head restraint system having swivel mechanism according to one embodiment of present invention

FIG. 2 is a schematic representation of head restraint system having swivel mechanism according to one embodiment of the present invention. FIG. 2 illustrates the connection of swivel rod 003 with the swivel mechanism 004. According to the embodiment of present invention, a spring 005 and a damper 006 assembly is accommodated in the swivel rod 003, such that it allows the angular movement of head restraint system if a load against spring and damper is applied. i.e. occupant resting his head on head restraint cushion 001.

The damper 006 offers resistance proportional to the amplitude and duration of load being applied. The load is considered as the weight of the head of occupant. In case of an impact load the damper offers extreme resistance and does not allow head restraint to swivel. The spring 005 helps in regaining the original position of head restraint after each swivel. In case of a gentle push i.e. occupant resting head on the headrest, the damper offers very less resistance allowing easy movement of the head restraint cushion. Likewise, in case of a harder impact, the damper restricts sudden motion by absorbing great amount of energy which otherwise would have been transferred to load. i.e., head of the occupant.

Figure 3:
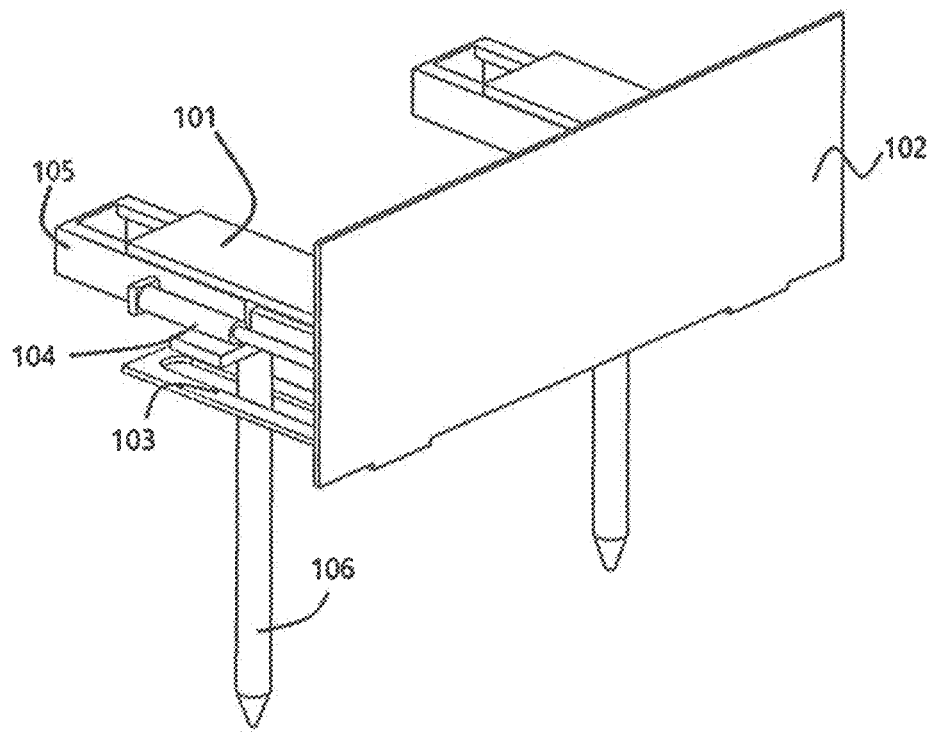
FIG. 3 is an isometric view of head restrains system with damping unit according to one embodiment of present invention.
Figure 4:
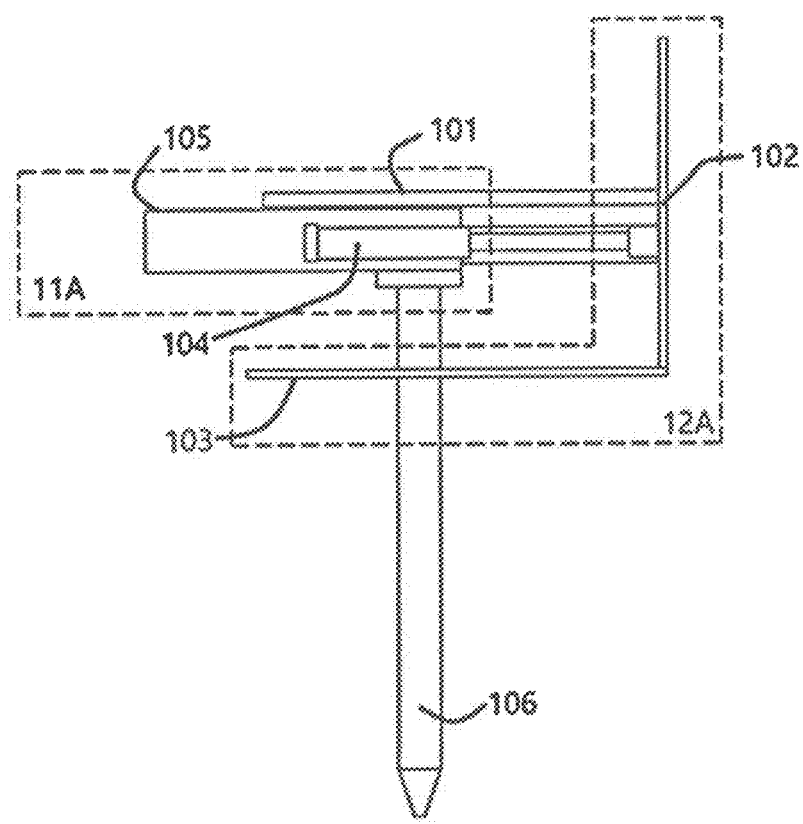
FIG. 4 is a cross sectional side view of head restrains system with damping unit according to one embodiment of present invention.

FIGS. 3 and 4 are an isometric view of head restraint system with damping unit and a cross sectional side view of head restraint system according to another embodiment of the present invention. The head restraint system according to the embodiment of present invention comprises a movable assembly 12A and a stationary assembly 11A as shown in FIG. 4. The movable assembly 12A comprises at least one slotted guide plate 103, at least one flat plate 102 and at least one slotted guide column 101 and a linear damping unit 104. Likewise, the stationary assembly 11A of the head restraint system comprises at least one guide rod 106, and at least one linear guide ways 105. The movable assembly 12A and the stationary assembly 11A of the head restraint system according to present invention are connected with the at least one liner damping unit 104. The head restrain system may have more than one set of movable assembly 12A and a stationary assembly 11A which depend on requirements of the design/invention.

The slotted guide plates 103 are flattened plates having rectangular slots. They are positioned at the bottom of rear side of the flat plates 102 to support the translatory motion. The flat plate 102 is the front end of the head restraint system according to one embodiment of present invention. The slotted guide column 101 is welded to flat plate 102 in the rear side. The linear damping unit 104 comprises a damper for controlling the movement of the movable assembly 12A. The damper includes but not limited to, circular damper, rotary damper, linear damper or any other form of damper known in the art.

The one or more guide rods 106 of the stationary assembly 11A of the head restraint system are welded to the linear guide ways 105. The guide rods 106 hold the whole head restraint system according to one embodiment of present invention. According to the design of the head restraint system, the singular guide rod 106 or plurality of guide rods 106 are welded/attached to the linear guide ways 105. The linear damping unit 104 is connected with the linear guide ways 105 to control the movement of the flat plates 102. The linear guide way 105 are designed in such a way that it enables to and fro movement of the linear damping unit 104.

FIG. 3 illustrates the perspective diagram of the guide members such as slotted guide plates 103 and linear guide ways 105 and the respective support members such as guide rods 106.

Consider that the flat plates 102 and the linear damping unit 104 of FIG. 3 is the normal operating position. In the event of the crash, specifically, a rear crash, the occupant thrusts against the flat plate 102 of the head rest due to the mass inertia. In case of an impact force, the displacement of the linear damper unit 104 is restricted by the linear guide ways 105 to avoid the whiplash effect for the occupant.

When the load is applied, the guides in the linear guide ways encompassed by the two linear slots, allow the movement of the flat plate 102 by compressing the linear damper unit 104. The linear damper unit 104, which is attached to the back side of the flat plates 102 and the stationary assembly in the guide ways, are tensioned while moving from normal operating position to the compressed position. When tension is relieved, the damper unit 104 returns the flat plate 102 to the normal/original position.

Figure 5:
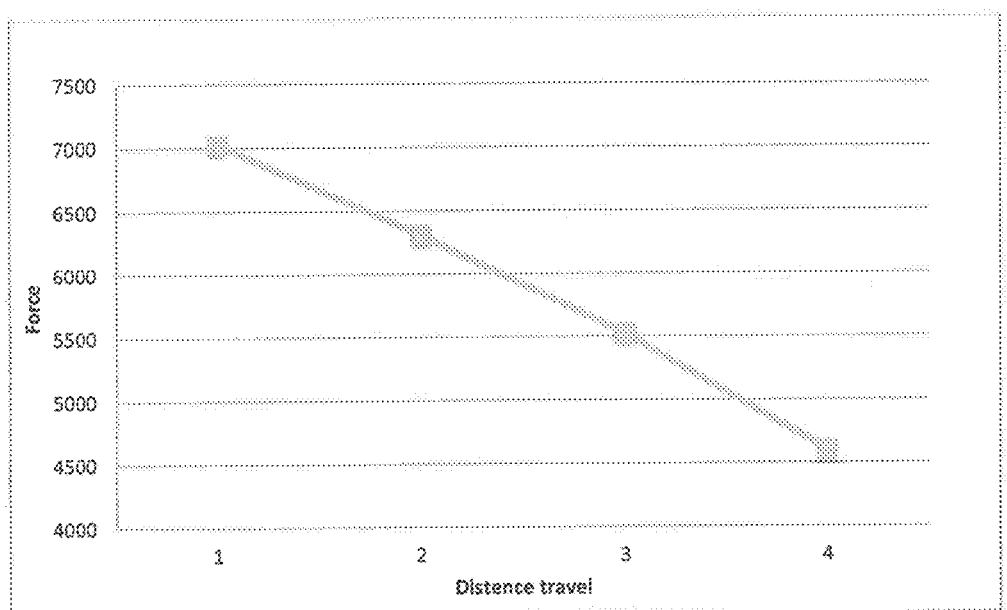
FIG. 5 is a graphical representation of distance moved by the head restrained system according to the application of load, according to one embodiment of present invention.

FIG. 5 is a graphical representation of distance moved by the head restrained system according to the application of load, according to one embodiment of present invention.

For instance, consider that the Initial Travelling speed of the vehicle is 100 km/hr and Mass (Head) of the head is 5 kg. The Impact timing is 0.01 second and the spring constant of the spring in the swivel mechanism is 5 N/mm.

Initial velocity is zero, U=0 ms-1, after impact, for a time of travel of 0.01 second and for a distance of 5 mm The calculation of initial velocity is explained below.

$$x = ut + \tfrac{1}{2}at^2$$

$$0.005 = 0 + \tfrac{1}{2}a(0.01)^2$$

$$a = 100 \text{ ms}^{-2}$$

$$v^2 = u^2 + 2as$$

$$0^2 = u^2 - 2*100*0.005$$

$$u^2 = 1$$

$$u = 1$$

Assume that, after the sudden impact, the speed of the vehicle is reduced from 100 km/hr. to 50 km/hr.

$$F_i = \text{Mass} * \frac{\text{change in velocity}}{\text{change in time}}$$

$$= 5 * \frac{(100-50)*1000}{(0.01*3600)}$$

$$= 6944.5 N$$

$$= 7000 N$$

In order to find the damping coefficient:

$$F_i = mx'' + cx' + kx$$

$$7000 = 5*100 + C*1 + 5*0.005$$

The damping coefficient C=6500 Nsm$^{-1}$

Force and distance travelled are calculated against the distance travelled by the head restraint system. The graphical representation of the same is shown in FIG. 5

1. At 4 mm $$U=1 \text{ ms}^{-1}, a=100 \text{ ms}^{-2}, v=?, F=?$$

$$v^2 = u^2 + 2as$$

$$v = \sqrt{0.8} = 0.894$$

$$F_i = mx'' cx' + kx$$

$$F_i = 5*100 + 6500*0.89 + 5*0.005 = 6285.025$$

2. At 3 mm $$V = 0.77 \text{ ms}^{-1}, F = 5505 \text{ ms}^{-2}$$

3. At 2 mm $$V = 0.632 \text{ ms}^{-1}, f = 4595 \text{ ms}^{-2}$$

Where,
Fi=Impact force
m=mass of body
C=Damping co-efficient
K=spring constant
x=linear distance From the graph, it is clear that the distance travelled by the head restraint system, gradually reduces as the amount of applied force increases.

Although the invention of the head restraint system for a vehicle has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

The invention claimed is:

1. A head restraint system for a vehicle with a swivel mechanism, the head restraint system comprising:
a head restraint cushion connected to one or more headrest rods;
a backrest of a seat; and
a swivel mechanism for providing angular movement to the head restraint cushion, the swivel mechanism fitted on top of the backrest and comprising one or more swivel rods, one or more dampers, and one or more springs;
wherein the angular movement of the head restraint cushion is controlled by movement of the dampers on application of load on the head restraint cushion, where the damper movement is based on the amplitude and duration of load being applied on the head restraint cushion.

2. The head restraint system as claimed in claim 1, wherein the headrest rod is pivoted at a rear side of the backrest to accommodate the swivel mechanism of the head restraint system, where the swivel mechanism provides swiveling of the head restraint system about a pivot point.

3. The head restraint system as claimed in claim 1, wherein the one or more dampers offer high resistance to impulsive loads and low resistance to non-impulsive loads.

4. The head restraint system as claimed in claim 1, wherein the angular movement of the head restraint cushion enables forward movement and backward movement.

5. The head restraint system as claimed in claim 1, wherein the load applied to the head restraint cushion actuates one of an extension or contraction of the spring, where the extension or contraction of the spring enables regaining an original position of the head restraint cushion.

6. The head restraint system as claimed in claim 1, wherein the head restraint system is a retrofit system.

7. A head restraint system for a vehicle comprising:
a swivel mechanism comprising a spring and a damper defining a pivot point;
a swivel rod coupled to the swivel mechanism and configured to pivot about the pivot point; and
a head restraint cushion coupled to the swivel rod;
wherein the damper is configured to provide resistance to angular movement of the swivel rod about the pivot point due to a load being applied to the head restraint cushion.

8. The head restraint system as claimed in claim 7, wherein the resistance in the damper is proportional to at least one of an amplitude or a duration of a load on the swivel rod.

9. The head restraint system as claimed in claim 8, wherein the resistance in the damper increases as the amplitude of the load increases.

10. The head restraint system as claimed in claim 8, wherein the resistance in the damper increases as the duration of the load increases.

11. The head restraint system as claimed in claim 8, wherein a larger load applied to the swivel rod reduces the angular movement of the swivel rod about the pivot point.

12. The head restraint system as claimed in claim 8, wherein swivel rod defines an original angular position before the load is applied and wherein the spring is configured to return the swivel rod to the original angular position after the load is released.

13. The head restraint system as claimed in claim 8, wherein the original angular position is adjustable before the load is applied.

14. The head restraint system as claimed in claim 7, further comprising a headrest rod coupling the head restraint cushion to the swivel rod;
    wherein the headrest rod is configured to adjust a vertical height of the head restraint cushion.

15. The head restraint system as claimed in claim 7, wherein the swivel mechanism is a first swivel mechanism and the swivel rod is a first swivel rod; and
    further comprising a second swivel rod;
    wherein the headrest rod is coupled to the first swivel rod and the second swivel rod.

16. The head restraint system as claimed in claim 15, further comprising a second swivel mechanism;
    wherein the second swivel rod is coupled to the second swivel mechanism.

17. The head restraint system as claimed in claim 7, wherein the swivel mechanism is coupled to a rear side of a backrest of a seat in the vehicle.

18. The head restraint system as claimed in claim 7, wherein swivel mechanism is disposed in the swivel rod.

19. The head restraint system as claimed in claim 7, wherein the head restraint system is a retrofit system.

* * * * *